United States Patent [19]
Aucktor et al.

[11] Patent Number: 4,678,453
[45] Date of Patent: Jul. 7, 1987

[54] CONSTANT VELOCITY RATIO UNIVERSAL JOINT

[75] Inventors: Erich Aucktor; Günter Gärtner, both of Offenbach am Main, Fed. Rep. of Germany

[73] Assignee: Löhr & Bromkamp GmbH, Offenbach am Main, Fed. Rep. of Germany

[21] Appl. No.: 783,057

[22] Filed: Oct. 1, 1985

Related U.S. Application Data

[63] Continuation of Ser. No. 608,913, May 10, 1984, abandoned, which is a continuation of Ser. No. 341,479, Jan. 21, 1982, abandoned.

[30] Foreign Application Priority Data

Jan. 29, 1981 [DE] Fed. Rep. of Germany ....... 3102871

[51] Int. Cl.[4] .............................................. F16D 3/21
[52] U.S. Cl. .................... 464/144; 464/146; 464/906
[58] Field of Search ............... 464/143, 144, 145, 146, 464/906

[56] References Cited

U.S. PATENT DOCUMENTS

| 2,325,460 | 7/1943  | Amberg         | 464/144   |
|-----------|---------|----------------|-----------|
| 3,071,944 | 1/1963  | Mazziotti et al. | 464/144 |
| 3,367,139 | 2/1968  | Ristau         | 464/144   |
| 3,447,341 | 6/1969  | Miller, Jr.    | 464/144   |
| 3,475,924 | 11/1969 | Aucktor        | 464/144   |
| 3,553,979 | 1/1971  | Noguchi et al. | 464/145   |
| 3,727,430 | 4/1973  | Eddy           | 464/906 X |

FOREIGN PATENT DOCUMENTS 2518147 10/1976 Fed. Rep. of Germany ...... 464/144

Primary Examiner—Daniel P. Stodola
Attorney, Agent, or Firm—Toren, McGeady & Associates

[57] ABSTRACT

In a universal joint assembly having an outer joint member with grooves in its internal wall, an inner joint member with opposed grooves, balls disposed one in each pair of the grooves, and a cage supporting the balls, there are included pairs of grooves formed of adjacent grooves one in each joint member with the pairs including pairs having grooves extending parallel to a center axis of the joint and pairs having grooves which are inclined or oblique relative to the center axis of the joint with adjacent oblique grooves in each of the joint members being inclined relative to the center axis at equal angles but in intersecting directions. Each joint member may have at least nine, and preferably twelve, grooves. The balls may be considered as divided into groups which provide the joint with improved ball control and torque transmitting ability.

5 Claims, 6 Drawing Figures

CONSTANT VELOCITY RATIO UNIVERSAL JOINT

This is a continuation of application Ser. No. 608,913, filed May 10, 1984, now abandoned, which is a continuation of application Ser. No. 341,479 filed Jan. 21, 1982, now abandoned.

The present invention relates generally to universal joint assemblies and more particularly to a rotary constant velocity ratio universal joint. More specifically, the invention is directed toward the orientation of grooves formed in the inner and outer joint members of such a universal joint within which balls are received in torque transmitting engagement.

Universal joints of the type to which the present invention relates usually comprise an outer joint member having a hollow form with an internal wall having a number of circumferentially spaced grooves formed therein. An inner joint member disposed in the outer joint member is formed with an equal number of grooves opposing those formed in the outer joint member. A plurality of balls is disposed, one in each pair of opposed grooves, in the joint members for effecting torque transmission therebetween. The balls are supported in a cage disposed between the joint members and retaining the balls with their centers in a common plane which bisects the angle between the axes of rotation of the inner and outer joint members.

In one form of a prior art joint of the type to which the present relates, disclosed in German Patent No. 25 18 147, six balls are provided with each ball serving both to transmit torque and to guide the cage in such a way that the plane of the ball centers bisects the angle between the axis of rotation of the joint members. Such joints have been found adequate for applications in the automotive industry and in engineering applications. Such joints are characterized by their simple and compact design. However, in such joints, if only one ball is worn, the joint will no longer function properly.

A further joint of the type to which the present invention relates is disclosed in U.S. Pat. No. 3,367,139. The joint of this type also has six balls with half of the groove extending axially parallel to the rotational axis of their joint member and with the other grooves being inclined in the same direction. In this joint, only the axially parallel grooves participate significantly in torque transmission and the inclined grooves control all the balls. Because the inclined grooves extend in the same direction, axial forces are produced between the joint members during torque transmission.

Generally, universal joints of the type described which are capable of relative axial movement or displacement between their joint members display the characteristic that control of the ball center plane is not uniform over the range of the articulation angles of the joint. Some joints may suffer from unsatisfactory control when the axes of the joint members are nearly aligned and others may display such characteristics at or near their maximum angle of articulation.

Accordingly, the present invention is directed toward provision of a joint assembly of the type described wherein disadvantages of the prior art are overcome or reduced.

SUMMARY OF THE INVENTION

Briefly, the present invention may be described as a universal joint assembly comprising an inner joint member, an outer joint member, ball means in torque transmitting engagement between the inner and outer joint members, cage means operatively supporting the ball means between said joint members, and groove means formed in said inner and outer joint members arranged in pairs each receiving said ball means therein. In accordance with the invention, the pairs of groove means include pairs of adjacent grooves arranged at an angle of inclination relative to a center axis of the assembly, with grooves of adjacent pairs being directed at angles of inclination which extend in opposite directions.

The advantage of a design such as that of the present invention arises in that adjoining grooves extending at an angle relative to the center axis form a group and that between these grooves provision is made for other grooves which also form a group and which extend in a direction parallel to the axis of the joint. The advantage of this type of groove combination is that the balls in one group achieve a high degree of ability to control operation in the lower range of articulation angles while the other group of balls achieves the same high degree of control in the upper range of articulation angles. Additionally, the range of articulation of this type of joint is enlarged if one group of balls no longer retains the ability to control and if the missing function is undertaken by the second group. Thus, the joint of the present invention as a whole displays a relatively uniform performance across the entire range of articulation angles.

The result of such an arrangement is that the joints may be used in cases which require a high degree of functional reliability and where standard joints might not be satisfactory. For example, joints of the type of the present invention may be used in aircraft, spacecraft, or in nuclear power reactors where the design and reliability of standard joints may not be adequate.

In such applications, joints with a high degree of functional safety are required. Additionally, aviation applications require very lightweight joints which, because of space availability, must have a short axial length relative to their diameter while nevertheless retaining a high torque transmitting capability. The resulting lack of joint rigidity is offset by the large centering diameters for both joint members.

In accordance with a further feature of the invention, each joint member may be formed with at least nine grooves thereby forming nine groove pairs of which at least three groove pairs extend parallel to the axial direction, with the remaining groove pairs having three groove pairs extending at one angle of inclination and three groove pairs extending at an angle of inclination which is equal but opposite to this angle of inclination.

Furthermore, the joint members may be provided with twelve groove pairs wherein six of the groove pairs are axially parallel and wherein three each of the remaining groove pairs are inclined in each of two opposed directions. With the structure of the present invention, even if the joint is not very rigid, none of the balls is likely to be overloaded. On the contrary, all of the balls will be equally loaded and accidental overloading will not necessarily result in immediate failure of the joint because the function of a particular group of balls may be undertaken by the remaining balls.

The various features of novelty which characterize the invention are pointed out with particularity in the claims annexed to and forming a part of this disclosure. For a better understanding of the invention, its operating advantages and specific objects attained by its use,

DETAILED DESCRIPTION OF THE PREFERRED EMBODIMENTS

Figure 1:
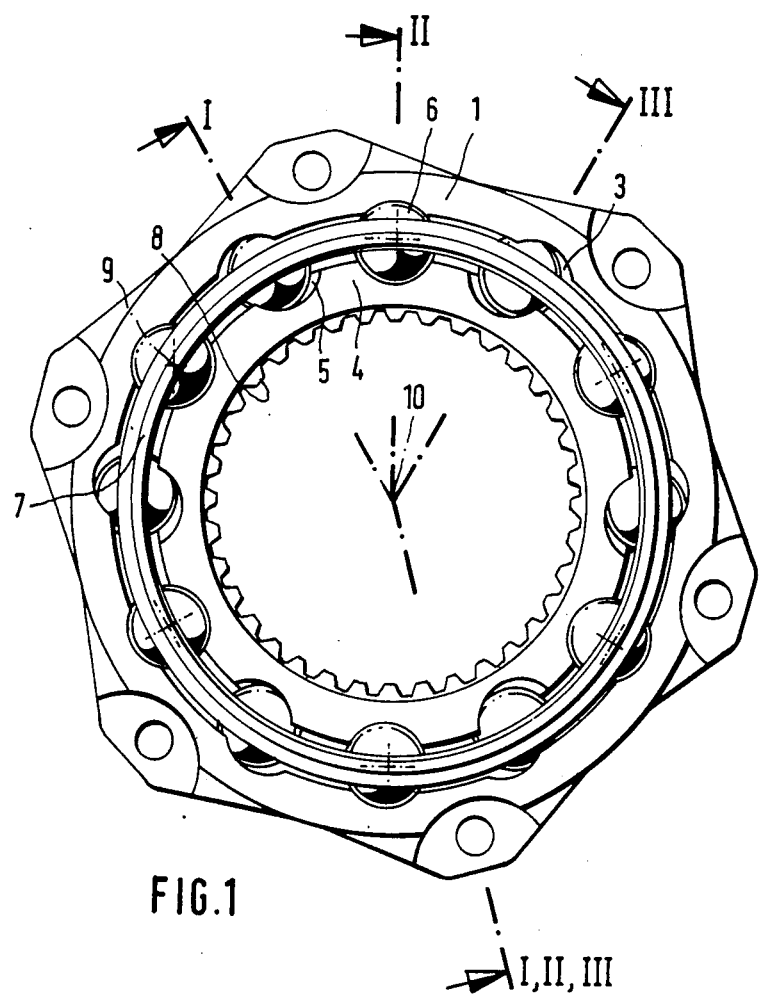
FIG. 1 is an axial view of a rotary constant velocity joint.
Figure 2:
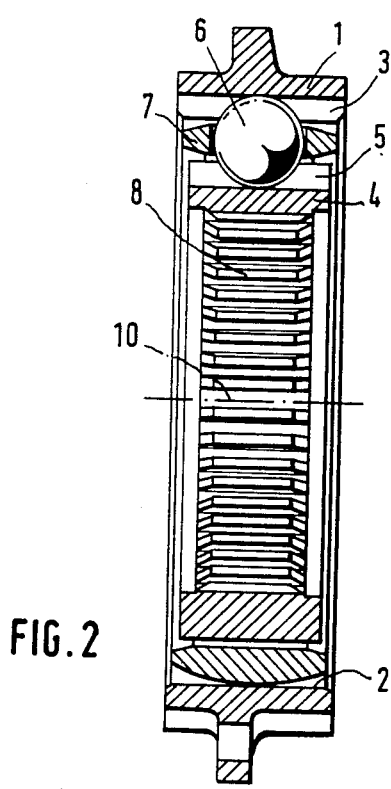
FIG. 2 is a sectional view taken along the lines I—I, II—II, and III—III of FIG. 1.

Referring now to the drawings and primarily to FIGS. 1 and 2 thereof, there is depicted a rotary constant velocity universal joint in accordance with the present invention which essentially consists of an outer joint member 1 having a cylindrical bore 2 provided with grooves 3. The joint includes an inner joint member 4 which is arranged so as to be axially movable relative to the outer joint member 1 and which, in its inner wall, is formed with grooves 5. Torque transmission balls 6 are received in the grooves 3 and 5, with the grooves 3 and 5 being arranged in pairs, each pair including one each of the grooves 3, 5 with the balls 6 being arranged one in each pair of grooves 3, 5. The balls 6 occupy the windows of a cage 7 having an annular configuration disposed between the inner and outer joint members and arranged to guide the balls 6. The inner joint member is formed with a blind bore 8 for receiving a drive shaft (not shown).

As indicated in the drawings, the joint includes groove pairs which have a common groove axis 9. Each second, or every other, groove pair extends with its axis 9 parallel to a joint center axis 10. Each groove pair having its grooves 3, 5 extending parallel to the joint center axis 10 receives a ball 6. It will therefore be apparent that every other groove pair of the joint includes a pair of grooves 3, 5 which, with the joint in its aligned or nonarticulated condition, will extend parallel to the axis 10 of the joint assembly.

In addition to the parallel groove pairs described above, the joint also includes oblique groove pairs, with each of the oblique groove pairs including adjacent grooves 3, 5 which extend at an oblique angle relative to the center axis 10. Furthermore, each of the grooves of each oblique groove pair extend at angles of inclination relative to the center axis 10 whereby the adjacent grooves of each oblique groove pair are arranged in an intersecting arrangement.

Thus, the balls 6 arranged in the oblique groove pairs will be arranged in intersecting grooves of the inner joint member 4 and the outer joint member 1. Thus, two adjacent cooperating intersecting grooves of the inner joint member 4 and the outer joint member 1 will have angle of inclination extending in opposite directions. Furthermore, two grooves each extending in the same joint member 1, 4 at the same angle will have, in relation to the joint center axis 10, angles of inclination, with the inclinations extending in opposed directions.

It will therefore be seen that the grooves of each pair of opposed grooves are inclined in opposite directions relative to each other but at equal angles relative to the joint center 10 so that the grooves in effect intersect to define a single point at which the respective ball can be received. This provides for control of the common plane of the centers of the balls to bisect the angle between the rotational axes of the joint members when the joint is articulated. Adjacent inclined grooves in each of the joint members are inclined in opposed directions at equal angles to the grooves of the parallel groove pairs and thus the grooves in each joint member may be considered as composed of three groups, i.e., those parallel to the joint member axis, those inclined in one direction, and those inclined in an opposed direction, thereby providing the advantages discussed above. As will be apparent, in FIG. 2, the grooves 3, 5 are shown in the plane of the drawing, and as a result the inclination of the grooves is not evident.

Figure 3:
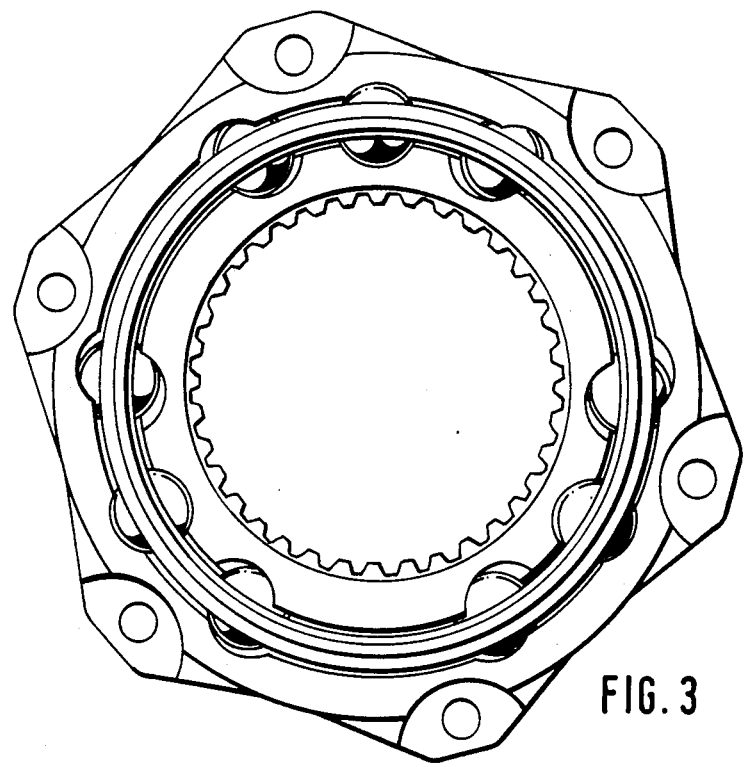
FIG. 3 is an axial view of a rotary constant velocity joint having nine torque transmitting balls.

FIG. 3 shows an embodiment wherein there are provided nine grooves in each of the inner and outer joint members. Thus, the outer joint member 1 is provided with three grooves 3 whose axes 9 extend parallel to the joint center axis 10 and the outer joint member 4 is provided with three grooves 5 whose axes 9 extend parallel to the joint center axis 10. With regard to the remaining grooves 3, 5, each of the grooves 3, 5 of the parallel groove pairs has formed on either side thereof a groove of an oblique group pair, with the grooves on either side of the parallel grooves being directed in opposed directions but at equal angles relative to the joint center axis.

Figure 4:
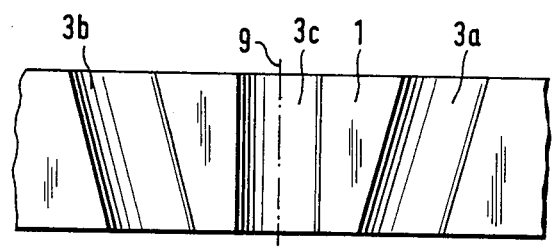
FIGS. 4 and 5 are plan views showing grooves in the inner and outer joint members of the assembly of the invention.

Thus, each parallel groove in the joint member is flanked by oppositely inclined grooves. The arrangement of the present invention is shown in greater detail in FIGS. 4 and 5. As shown in FIG. 4, the outer joint member 1 is formed to include a parallel groove 3c of a parallel groove pair and oblique grooves 3a and 3b of two flanking oblique groove pairs. It will be noted that the grooves 3a and 3b of the oblique group pairs shown in FIG. 4 extend at different or opposed angles relative to the center axis 9 of the parallel groove 3c.

Figure 5:
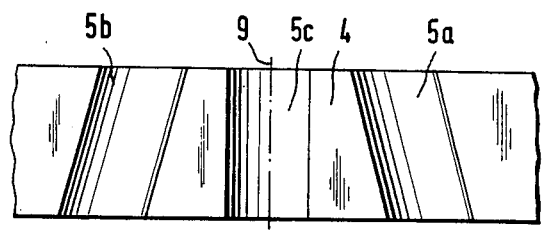

Similarly, as shown in FIG. 5, the inner joint member 4 is formed with a parallel groove 5c of a parallel groove pair, the groove 5c together with the groove 3c shown in FIG. 4 constituting a parallel groove pair.

On either side of the parallel groove 5c, there is formed an oblique groove 5a, 5b of the oblique groove pairs. It will be noted that, as shown again in FIG. 5, the flanking oblique grooves 5a and 5b are directed at angles of inclination which are opposed relative to each other. The adjacent grooves 3a, 5a form one oblique groove pair and the adjacent grooves 3b, 5b form another oblique groove pair.

Furthermore, it will be noted that taken relative to the joint center axis 10 when the joint is in the nonarticulated condition or taken relative to the center axis 9 of the adjacent parallel groove, each of the grooves of the oblique groove pairs extends at an equal angle of inclination.

Figure 6:
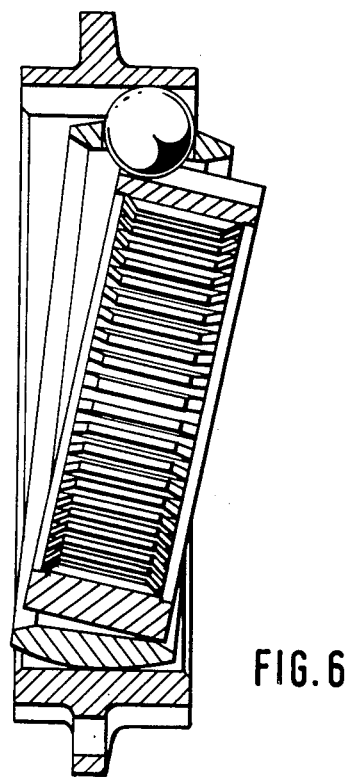
FIG. 6 is a sectional view showing a joint in an articulated position

FIG. 6 illustrates a joint in accordance with the present invention shown in its articulated position. It will be noted that the inner joint member 4 and the outer joint member 1 are moved relative to each other. FIG. 6 shows the manner in which the illustrated ball 6 has been displaced such that it has moved through half the distance by which the joint members have been moved.

Otherwise, the embodiment shown in FIG. 6 corresponds to that depicted in FIG. 2.

While specific embodiments of the invention have been shown and described in detail to illustrate the application of the inventive principles, it will be understood that the invention may be embodied otherwise without departing from such principles.

What is claimed is:

1. In a rotary constant velocity universal joint having a joint center axis including an outer hollow joint member having an inner wall provided with outer grooves, an inner joint member arranged in said outer joint member, with said inner joint member having an outer wall with a number of inner grooves therein corresponding to the number of outer grooves in said outer joint member, with one groove of each of said outer and inner joint members jointly comprising a groove pair, with each groove pair, for torque transmitting purposes, receiving a ball which is guided by a cage arranged between said inner and outer joint members and whose center is maintained in a plane which bisects the angle between the axes of said inner and outer joint members, said grooves pairs including oblique pairs each comprised of grooves which extend at an oblique angle relative to said center axis of said joint, and parallel groove pairs each comprised of grooves which are arranged to extend parallel to the direction of said joint axis, the improvement comprising that said oblique groove pairs and said parallel groove pairs are arranged to includes adjoining oblique groove pairs with one parallel groove pair therebetween and that adjoining inner and outer grooves, respectively, of said oblique groove pairs are arranged at angles of inclination which extend transversely relative to each other.

2. A joint according to claim 1, wherein said joint is formed with twelve groove pairs of which six are said parallel groove pairs with three oblique groove pairs being comprised of grooves having an angle of inclination relative to said joint axis which is equal in degree to that of the grooves of the remaining three oblique groove pairs and which extends transversely relative thereto.

3. In a rotary constant velocity universal joint having a joint center axis including an outer hollow joint member having an inner wall provided with outer grooves, an inner joint member arranged in said outer joint member, with said inner joint member having an outer wall with a number of inner grooves therein corresponding to the number of outer grooves in said outer joint member, with one groove of each of said outer and inner joint members jointly comprising a groove pair, with each groove pair, for torque transmitting purposes, receiving a ball which is guided by a cage arranged between said inner and outer joint members and whose center is maintained in a plane which bisects the angle between the axes of said inner and outer joint members, said groove pairs including oblique groove pairs each comprised of grooves which extend at an oblique angle relative to said center axis of said joint, and parallel groove pairs each comprised of grooves which are arranged to extend parallel to the direction of said joint axis, the improvement comprising that said oblique groove pairs and said parallel groove pairs are arranged in sets each having two oblique groove pairs with one parallel groove pair therebetween and that adjoining inner and outer groove, respectively, of said oblique groove pairs are arranged at angles of inclination which extend transversely relative to each other.

4. A joint according to claim 3, wherein said joint is formed with at least nine groove pairs of which at least three are said parallel groove pairs, with three oblique groove pairs being comprised of grooves having an angle of inclination which is equal in degree to that of the grooves of the remaining three oblique groove pairs and which extends transversely relative thereto.

5. An assembly according to claim 3 wherein the grooves of said oblique groove pairs extend at generally equivalent angles relative to the center axis of the joint member in which said respective groove is formed.

* * * * *